(12) United States Patent
Hu

(10) Patent No.: US 11,300,971 B2
(45) Date of Patent: Apr. 12, 2022

(54) CARGO CONTAINER BUTTING METHOD AND APPARATUS, ROBOT, AND STORAGE MEDIUM

(71) Applicant: BEIJING GEEKPLUS TECHNOLOGY CO., LTD., Beijing (CN)

(72) Inventor: Bin Hu, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/870,579

(22) Filed: May 8, 2020

(65) Prior Publication Data

US 2020/0348683 A1 Nov. 5, 2020

Related U.S. Application Data

(63) Continuation of application No. PCT/CN2019/095354, filed on Jul. 10, 2019.

(30) Foreign Application Priority Data

Oct. 18, 2018 (CN) .................. CN201811214271

(51) Int. Cl.
*G05D 1/02* (2020.01)
*B25J 9/16* (2006.01)
(Continued)

(52) U.S. Cl.
CPC .......... *G05D 1/0234* (2013.01); *B25J 9/1664* (2013.01); *B25J 13/089* (2013.01);
(Continued)

(58) Field of Classification Search
CPC .. G05D 1/0234; G05D 1/0238; G05D 1/0244; G05D 1/0246; G05D 2201/0216; B25J 9/1664; B65G 1/1379
See application file for complete search history.

(56) References Cited

U.S. PATENT DOCUMENTS 4,684,247 A * 8/1987 Hammill, III ........ B66F 9/0755
356/152.2
9,280,153 B1 * 3/2016 Palamarchuk ....... G05D 1/0297
(Continued)

FOREIGN PATENT DOCUMENTS

CN 1959578 A 5/2007
CN 202864200 U 4/2013
(Continued)

OTHER PUBLICATIONS

International Search Report for PCT/CN2019/095354 dated Oct. 15, 2019 in English Translation.
(Continued)

*Primary Examiner* — Timothy R Waggoner
(74) *Attorney, Agent, or Firm* — Bayramoglu Law Offices LLC

(57) ABSTRACT

Provided is a cargo container butting method executed by a robot. The method includes: in a case of traveling to a butting region of a target cargo container, determining a reference position according to a position of a target marker on the target cargo container and adjusting a travel direction of the robot according to the reference position, traveling into a bottom of the target cargo container according to the adjusted travel direction, traveling to a butting position of the target cargo container, and butting the target cargo container on the bottom of the target cargo container. Provided further are a robot and a storage medium.

20 Claims, 7 Drawing Sheets

(51) Int. Cl.
  *B25J 13/08*   (2006.01)
  *B65G 1/137*   (2006.01)
  *G06K 19/077*  (2006.01)

(52) U.S. Cl.
  CPC ..... *B65G 1/1373* (2013.01); *G06K 19/07758* (2013.01); *G05D 2201/0216* (2013.01)

(56) References Cited

U.S. PATENT DOCUMENTS

| | | | |
|---|---|---|---|
| 2013/0120576 A1 | 5/2013 | Cheng et al. | |
| 2016/0226186 A1* | 8/2016 | Griepenstroh | H01R 13/436 |
| 2016/0236869 A1* | 8/2016 | Kimura | G05D 1/0291 |
| 2016/0334799 A1* | 11/2016 | D'Andrea | B66F 9/063 |
| 2018/0043533 A1 | 2/2018 | Johnson et al. | |
| 2018/0074504 A1* | 3/2018 | Shydo, Jr. | G05D 1/0214 |
| 2018/0089616 A1* | 3/2018 | Jacobus | G05D 1/0274 |
| 2018/0215539 A1* | 8/2018 | Kimura | G05D 1/0274 |

FOREIGN PATENT DOCUMENTS

| | | |
|---|---|---|
| CN | 103587869 A | 2/2014 |
| CN | 105593143 A | 5/2016 |
| CN | 106005866 A | 10/2016 |
| CN | 106379684 A | 2/2017 |
| CN | 107636547 A | 1/2018 |
| CN | 107922119 A | 4/2018 |
| CN | 109018810 A | 12/2018 |
| EP | 2704882 A2 | 3/2014 |
| JP | 60-078035 S | 6/1975 |
| JP | 2014118216 A | 6/2014 |
| WO | 2012151126 A2 | 8/2012 |
| WO | 2017090108 A1 | 11/2017 |

OTHER PUBLICATIONS

First Office Action for CN201811214271.1 filed on Oct. 18, 2018 issued by the State Intellectual Property Office of People's Republic of China dated Jul. 25, 2019 with English Machine Translation.

* cited by examiner

CARGO CONTAINER BUTTING METHOD AND APPARATUS, ROBOT, AND STORAGE MEDIUM

CROSS-REFERENCE TO RELATED APPLICATIONS

This is a continuation of International Patent Application No. PCT/CN2019/095354, filed on Jul. 10, 2019, which claims priority to a Chinese patent application No. 201811214271.1 filed on Oct. 18, 2018, contents of both of which are incorporated herein by reference in their entireties.

TECHNICAL FIELD

The present disclosure relates to the technical field of warehousing, for example, to a cargo container butting method, apparatus, robot and storage medium.

BACKGROUND

With the rapid development of the electronic commerce and robot industries, great technical changes are brought to the whole warehousing industry, and especially more and more robots are applied in the warehousing industry, and a cargo container in a warehouse or near a production line may be automatically moved through a robot. In a moving manner in the related art, a cargo container is placed at a predetermined position, and a positioning auxiliary mark is attached to a ground surface (for example, a ground point vertically mapped to a central position of the cargo container) of the predetermined position for identification of the predetermined position. A robot searches for a position of the cargo container by using the predetermined position and the attached positioning auxiliary mark, butts the cargo container on a bottom of the cargo container at the position of the cargo container, and automatically moves the cargo container after butting the cargo container.

However, in practical use, due to placing precision or other reasons, a practical placing position of the cargo container deviates from the predetermined coordinate position (such as, translation, rotation within a certain angle, or both). Therefore, a positioning auxiliary mark is also attached on the cargo container, and after the robot is aligned with the positioning auxiliary mark at the predetermined position, the positioning auxiliary mark on the cargo container is also searched back and forth around the positioning auxiliary marker according to a certain manner to be precisely butted the cargo container, thereby affecting an efficiency of the robot in butting the cargo container, making time of the robot in moving the cargo container longer, and reducing an efficiency of the robot in moving the cargo container.

SUMMARY

The present disclosure provides a cargo container butting method, apparatus, robot, and a storage medium, so as to improve an efficiency of butting the cargo container, thereby reducing time of the robot in moving the cargo container.

In an embodiment, a cargo container butting method is provided in the embodiment of the present disclosure, and is executed by a robot. The method includes steps described below.

In a case of traveling to a butting region of a target cargo container, a reference position is determined according to a position of a target marker on the target cargo container and a travel direction of the robot is adjusted according to the reference position.

The robot travels into a bottom of the target cargo container according to the adjusted travel direction, travels to a butting position of the target cargo container, and butts the target cargo container at the butting position of the bottom of the target cargo container.

In an embodiment, a robot is also provided in the embodiment of the present disclosure. The robot includes:

a marker identification module and a tag identification module;

at least one processor; and a storage apparatus, which is configured to store at least one program.

When executed by the at least one processor, the at least one processor implements the method of the above-mentioned embodiment.

In an embodiment, a computer-readable storage medium is provided in the embodiment of the present disclosure. The computer-readable storage medium stores a computer program which, when executed by a processor, implements the method described by the above-mentioned embodiment.

In an embodiment, a robot is also provided in the embodiment of the present disclosure. The robot includes a first sensor, a memory and a processor. The processor is electrically connected to the first sensor and the memory respectively.

The first sensor is configured to identify a container foot of a target cargo container in a process of the robot traveling into a bottom of the target cargo container. The memory stores a computer program which, when executed by the processor, implements operations described below.

A position of the container foot of the target cargo container is calculated according to an identification result of the first sensor.

A butting route and a butting position of the robot and the target cargo container are determined according to at least the position of the container foot of the target cargo container.

The robot is controlled to, according to the butting route, travel into the bottom of the target cargo container and travel to the butting position, where the robot butts the target cargo container at the butting position.

DETAILED DESCRIPTION

Figure 1:
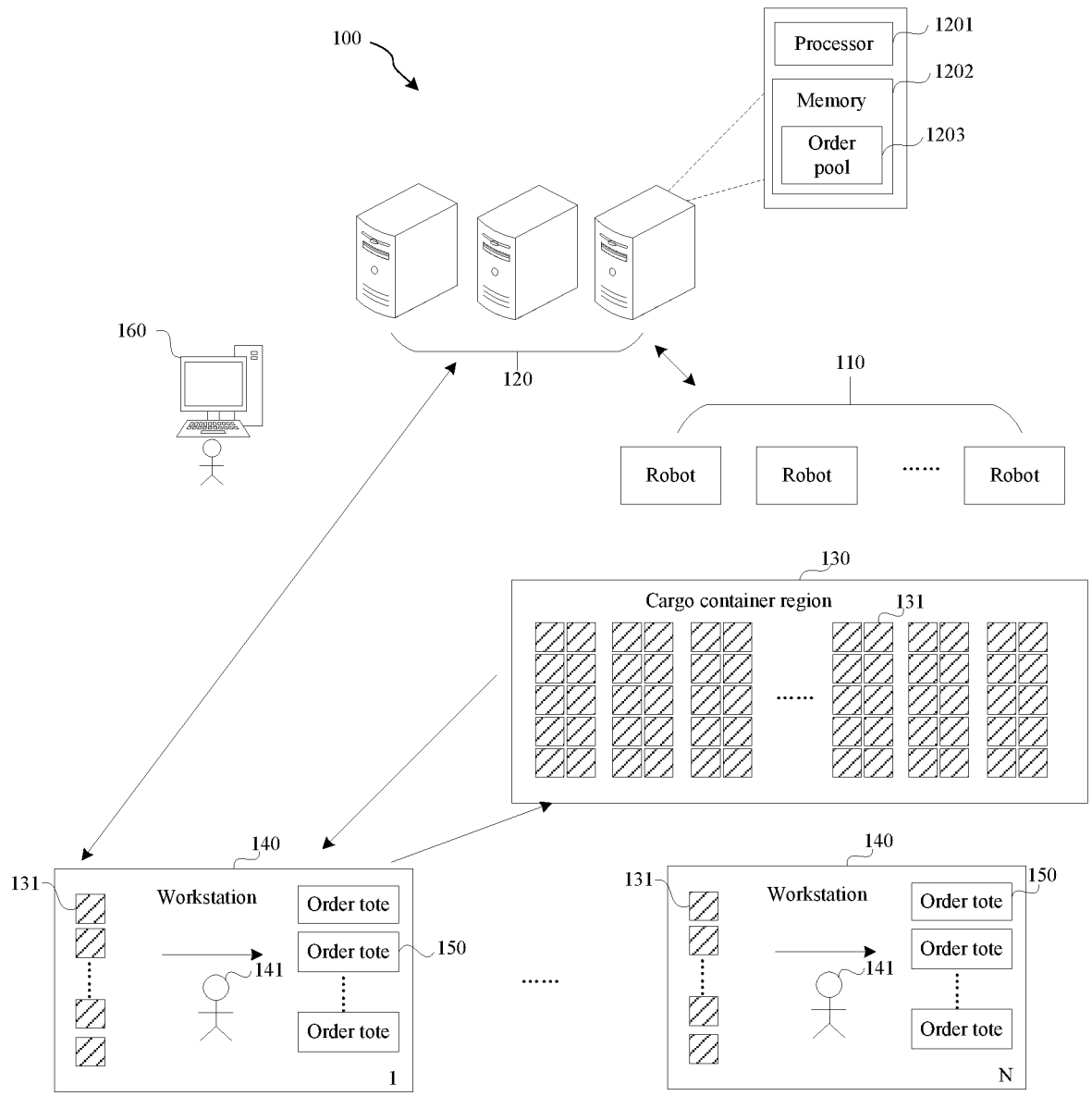
FIG. 1 is a structural diagram of a cargo picking system according to an embodiment of the present disclosure.

The present disclosure will be described below in conjunction with the drawings and embodiments. The detailed description of the embodiments set forth below is intended to explain and not to limit the present disclosure. For ease of description, only part, not all, of structures related to the present disclosure are illustrated in the drawings.

FIG. 1 is a structural diagram of a cargo picking system according to an embodiment of the present disclosure. Referring to FIG. 1, the cargo picking system 100 includes: a robot 110, a control system 120, a cargo container region 130 and a workstation 140. Multiple cargo containers 131 are arranged in the cargo container region 130, one or more types of cargos are placed on the cargo containers 131, for example, like a shelf where a variety of cargos are arranged in a supermarket, the multiple cargo containers 131 are arranged in an array. Generally, multiple work stations 140 may be arranged on a side of the cargo container region 130, and the robot 110 may be a self-driven robot.

The control system 120 wirelessly communicates with the robot 110, an operator may operate the control system 120 through a console 16, and the robot 110 performs a task of transporting the cargo container under the control of the control system 120. The cargo container may include, but not limited to, a shelf and a cage trolley. Taking that the cargo container 131 is a shelf as an example, the robot 110 may travel along an empty space (a part of a passage for the robot 110) in a shelf array, travel to a bottom of a shelf 131, lift the shelf 131 by using a lifting mechanism, and transport the shelf 131 to an assigned workstation 140. Alternatively, taking that the cargo container 131 is a cage trolley as an example, the robot 110 may travel along the empty space (the part of a passage for the robot 110) in a cage trolley array, move to a bottom of a cage trolley 131, lift the cage trolley 131 by using the lifting mechanism or pull the cage trolley 131 by using a hook mechanism, and transport the cage trolley 131 to an assigned workstation 140. In an example, the robot 110 may have the lifting mechanism or the hook mechanism, and have an autonomous navigation function. The robot 110 may travel to the bottom of the cargo container 131, and lift the entire cargo container 131 by using the lifting mechanism or pull the entire cargo container 131 by using the hook mechanism, so that the cargo container 131 may move up and down with the lifting mechanism having a lifting function or be pulled with the hook mechanism. In an example, the robot 110 may perform positioning and travel forward according to two-dimensional code information captured by a camera, and may travel along a route determined by the control system 120 to the underneath of the cargo container 131 prompted by the control system 120. The robot 110 transports the cargo container 131 to the workstation 140, and a picker 141 or a picking robot at the workstation 140 picks the cargo from the cargo container 131 and puts them into an order tote 150 to wait for packaging.

The control system 120 is a software system which runs on a server and is capable of storing data and processing information. The control system 120 may be connected to a robot, a hardware input system and other software systems through a wireless or wired connection. The control system 120 may include one or more servers, and may have a centralized control architecture or a distributed computing architecture. The server may have a processor 1201 and a memory 1202. The memory 1202 may include an order pool 1202.

Taking the picking system shown in FIG. 1 as an example, in the related art, when the robot 110 moves the cargo container (for example, a shelf or a cage trolley) in the warehouse, the robot 110 may search for a target cargo container disposed at a predetermined position, butt the found target cargo container, and then move the butted target cargo container. In addition, in the related art, in order to quickly and precisely find the target cargo container at the predetermined position, a positioning auxiliary marker may be attached at the predetermined position. By the positioning auxiliary mark, the target cargo container is quickly and precisely found, and then butted and moved. However, in practical use, due to placing precision or other reasons, a practical placing position of the cargo container deviates from the predetermined coordinate position. The robot 110 cannot quickly find the target cargo container by the predetermined position and the positioning auxiliary marker at the predetermined position, and therefore cannot quickly butt the target cargo container. Accordingly, the butting manner needs improvement to enhance efficiency of butting the cargo container.

A cargo container butting method, apparatus, robot and storage medium provided by the present disclosure are described in detail through below-mentioned embodiments.

Figure 2:
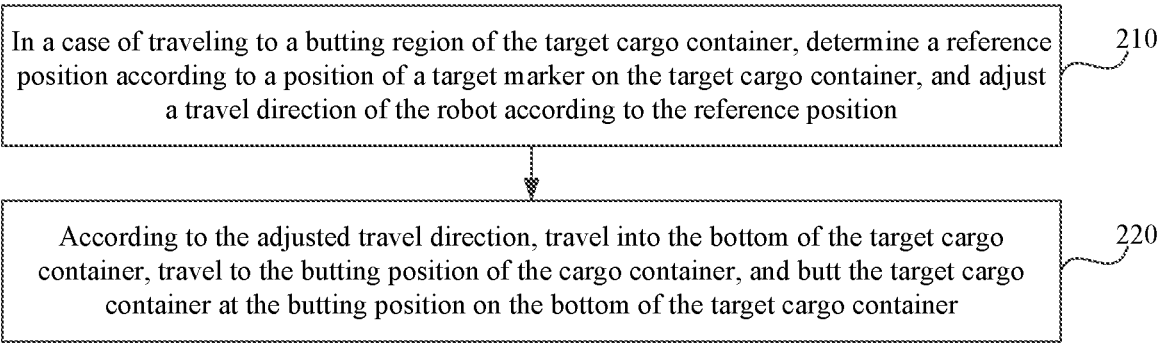
FIG. 2 is a flowchart of a cargo container butting method according to an embodiment of the present disclosure.

FIG. 2 is a flowchart of a cargo container butting method according to an embodiment of the present disclosure. The embodiment of the present disclosure may be applied in a case of the robot moving one or more cargo containers in a warehouse or near a production line, for example, moving a shelf and a cage trolley in the warehouse or near the production line. The method may be performed by a cargo container butting apparatus. The apparatus may be implemented by software and/or hardware, and may be integrated in any robot with a network communication function. The robot may be a self-driven robot.

As shown in FIG. 2, the cargo container butting method according to the embodiment of the present disclosure may include step 210 and step 220.

In step 210, in a case of traveling to a butting region of the target cargo container, a travel direction of the robot is adjusted according to a position of a target marker on the target cargo container.

Figure 3A:
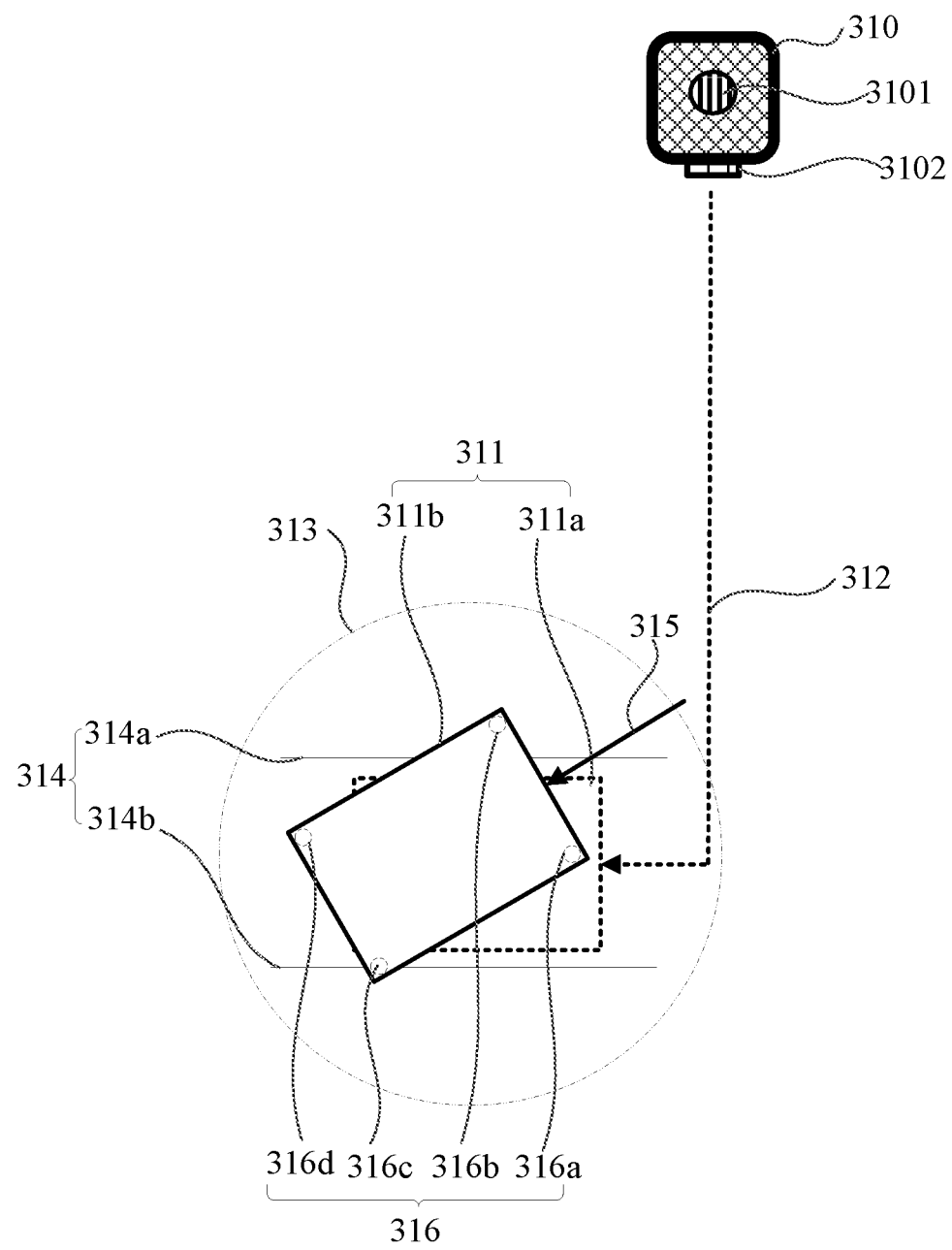
FIG. 3A is a schematic top view of a robot traveling toward a bottom of a cargo container according to an embodiment of the present disclosure.

In an embodiment of the present disclosure, FIG. 3A is a schematic top view of a robot traveling toward a bottom of a cargo container according to the embodiment of the present disclosure. In an example, taking that the robot 310 automatically transports the cargo container in the warehouse or near the production line as an example, FIG. 3A shows the robot 310, a cargo container 311a without deviation, a cargo container 311b with deviation, a travel path 312, a butting region 313, and a predetermined position 314 defined by a first predetermined position line 314a and a second predetermined position line 314b. When the target cargo container is the cargo container 311a without deviation, the robot 310 may precisely travel into a bottom of the cargo container 311a without deviation according to the travel path 312 and butt the cargo container 311a without deviation, and may move the cargo container 311a without deviation to an appropriate position after butting.

In an embodiment of the present disclosure, the target cargo container may include multiple target markers, which may be disposed on different positions of the target cargo container. Referring to FIG. 3A, and taking that the target cargo container is a shelf 311b as an example, the multiple target markers may be disposed on positions of different feet on the bottom of the target cargo container or at the predetermined positions on a side of the target cargo container. The target marker may be understood to be a container mark for identifying the target cargo container. The container mark may be a specific identifiable tag on the cargo container, such as a two-dimensional code tag; or, the container mark may be a container structure feature that is inherent to the cargo container, such as four container legs at positions of four different feet of the bottom of the cargo container or a container foot structure of the four container legs at the positions of the four different feet on the bottom of the cargo container.

In an embodiment of the present disclosure, due to placing precision of the cargo container or other reasons, a practical placing position and/or angle of the cargo container deviates at the predetermined position. A case that the cargo container deviates may include that a placing position of the cargo container at the predetermined position deviates in a distance and/or a placing angle at the predetermined position deviates in an angle. Referring to FIG. 3A, in one example, taking a cargo container 311b with deviation as the target cargo container, a certain bias exists between a placing position and/or an angle of a cargo container 311b with deviation at the predetermined position 314 and a placing position and/or an angle of a cargo container 311a without deviation at the predetermined position 314. When the target cargo container is the cargo container 311b with deviation, because the placing position and/or the placing angle of the cargo container 311b with deviation are different from the placing position and/or the placing angle of the cargo container 311a without deviation at the predetermined position 314, the robot 310 cannot directly travel to a bottom of the cargo container 311b with deviation according to the travel path 312 used when the robot reaches the cargo container 311a without deviation, and after the robot 310 reaches the proximity of the predetermined position 314 according to the travel path 312, the robot can travel to the bottom of the cargo container 311b with deviation through multiple trials near the predetermined position 314. In another example, still taking the cargo container 311 with deviation as the target cargo container, in a case where a deviation angle of the cargo container 311b is relatively small, since the position and/or the angle of the cargo container 311b have already deviated at the predetermined position, a butting position between the cargo container 311b and the robot 310 also changes accordingly. Therefore, even if the robot 310 can travel to the bottom of the cargo container 311b, the robot 310 cannot directly reach the butting position to butt the cargo container 311b, and the robot needs to search for the butting position to complete the butting process.

It should be understood that in above cases, the robot 310 wastes a large amount of time while butting the target cargo container. Based on this, in order to ensure that the robot 310 rapidly travels to the bottom of the target cargo container, reaches the butting position of the target cargo container and butts the target cargo container, after receiving a butting instruction for butting the target cargo container, the robot may travel in a direction towards the target cargo container, and adjust the travel direction of the robot according to positions of the multiple target markers on the target cargo container, so as to subsequently travel to the butting position of the bottom of the target cargo container according to the adjusted travel direction and perform the butting operation of the cargo container.

In an embodiment of the present disclosure, when adjusting the travel direction of the robot, the robot may not necessarily adjust immediately after receiving a butting instruction, and may adjust after detecting that the robot has traveled to the butting region of the target cargo container. Of course, if a position at which the robot receives the butting instruction is exactly in the butting region of the target cargo container, the travel direction of the robot may be immediately adjusted. In an embodiment, when it is detected that the robot has traveled to the butting region of the target cargo container, the travel direction of the robot is adjusted according to the position of the target marker disposed on the target cargo container. In an embodiment, the butting region of the target cargo container may be determined based on a predetermined position where the target cargo container is to be placed, for example, the butting region of the target cargo container may be a region of a preset distance range centered at the predetermined position. Alternatively, the butting region of the target cargo container may be determined according to the practical placing position of the target cargo container, for example, when it is detected that a distance between the robot and one marker of the target cargo container is smaller than a preset distance, it may be considered that the robot has traveled to the butting region of the target cargo container. In one example, when it is detected that a distance between a current position of the robot and a position of any one of the predetermined markers of the target cargo container is smaller than a preset distance threshold, it means that the robot has traveled to the butting region of the target cargo container, and in this case, the robot may adjust the travel direction according to the position of the target marker on the target cargo container.

In an embodiment of the present disclosure, referring to FIG. 3A, still taking the cargo container 311b with deviation as the target cargo container, since the placing position and the placing angle of the target cargo container deviate, the robot may adjust the travel direction of the robot according to the practical placing position and/or the practical placing angle of the target cargo container at the predetermined position. In an embodiment, the robot may determine the practical placing position and/or the practical placing angle of the target cargo container at the predetermined position according to the positions of the target markers on the target cargo container, and adjust the travel direction of the robot according to the practical placing position and/or the practical placing angle of the target cargo container at the predetermined position. In an embodiment of the present disclosure, the target cargo container may be a shelf allowing for fixed placement, or may be a cage trolley with universal wheels or other wheels.

In step 220, the robot travels into the bottom of the target cargo container according to the adjusted travel direction, and butts the target cargo container on the bottom of the target cargo container.

Figure 3B:
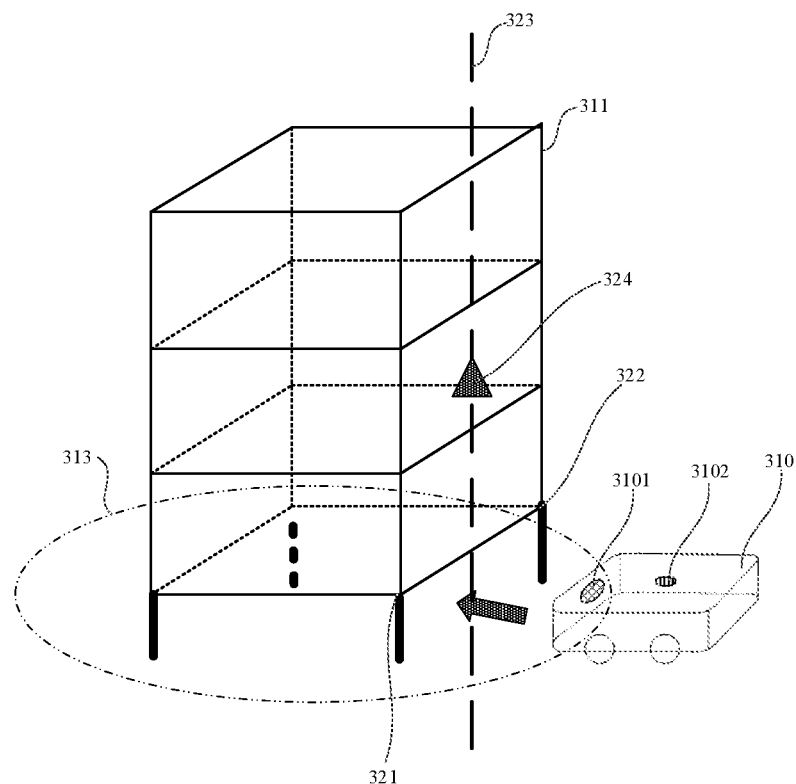
FIG. 3B is a schematic side view of a robot traveling into a bottom of a cargo container according to an embodiment of the present disclosure.
Figure 3C:
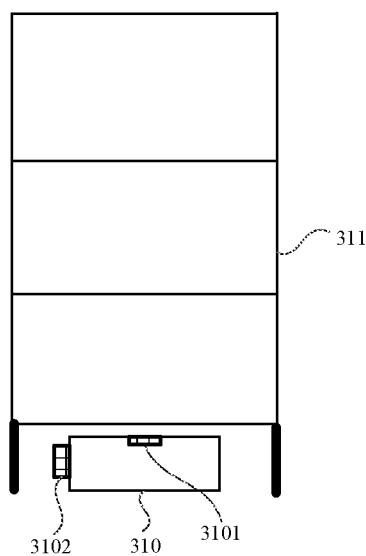
FIG. 3C is a schematic side view of a robot butting under a bottom of a cargo container according to an embodiment of the present disclosure.
Figure 3D:
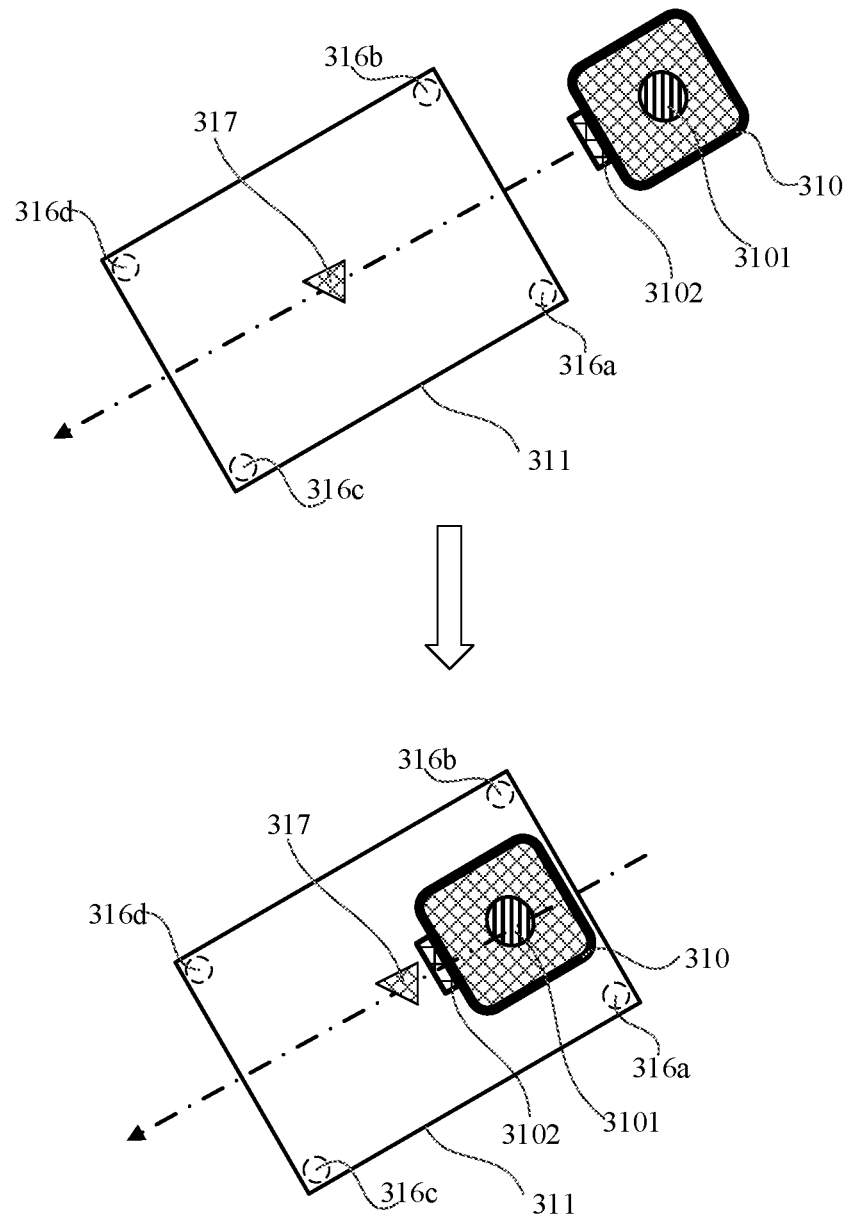
FIG. 3D is a schematic top view of a robot butting under a bottom of a cargo container according to an embodiment of the present disclosure.

In an embodiment of the present disclosure, FIG. 3B is a schematic side view of a robot traveling toward a bottom of a cargo container according to the embodiment of the present disclosure. Referring to FIG. 3B, when the robot travels to the butting region, the travel direction of the robot may be adjusted according to the position of the target marker on the target cargo container, and the robot may travel into the bottom of the target cargo container according to the adjusted direction. For example, taking the adjusted travel direction of the robot as an adjustment direction 315 (shown in FIG. 3A), the robot may enter the underneath of the bottom of the cargo container according to the adjustment direction 315. FIG. 3C is a schematic side view of a robot butting on a bottom of a cargo container according to an embodiment of the present disclosure, and FIG. 3D is a schematic top view of a robot butting on a bottom of a cargo container according to an embodiment of the present disclosure. Referring to FIG. 3C and FIG. 3D, when the robot travels into the bottom of the target cargo container, the robot may butt the cargo container on the bottom of the cargo container, so that the robot moves the butted cargo container to a position where it needs to be moved. In an embodiment, when the robot 310 butts the target cargo container 311 on the bottom of the target cargo container 311 (the target cargo container may be the shelf or the cage trolley), the robot 310 may lift the target cargo container 131 on the bottom of the cargo container 311 through a lifting mechanism or pull the target cargo container 131 through a hooking mechanism. It should be understood that any one of the above-mentioned manners may be used as a manner of butting the target cargo container 311.

A cargo container butting method provided in the embodiment of the present disclosure includes steps described below. When a robot travels to a butting region of a target cargo container, a reference position is determined according to a position of the target marker on the target cargo container, a travel direction of the robot is adjusted according to the reference position, the robot travels into the bottom of the target cargo container and travel to the butting position of the target cargo container according to the adjusted travel direction, and the robot butts the target cargo container at the butting position of the bottom of the target cargo container.

The present disclosure enhances the efficiency of butting the cargo container, thereby reducing time of the robot moving the cargo container, and enhancing the efficiency of moving the cargo container.

Figure 4:
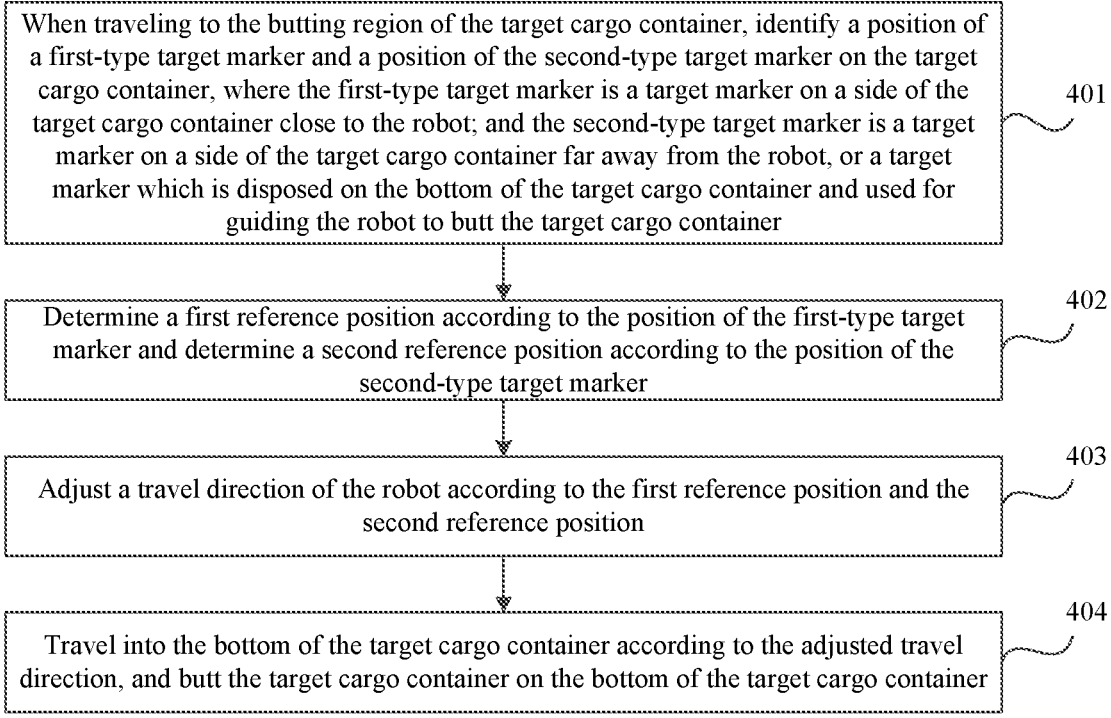
FIG. 4 is a flowchart of another cargo container butting cargo container butting method according to an embodiment of the present disclosure.

FIG. 4 is a flowchart of another cargo container butting method according to an embodiment of the present disclosure. Based on the above-mentioned embodiments, the embodiment of the present disclosure optimizes steps of adjusting the travel direction of the robot according to the position of the target marker on the target cargo container. The embodiment of the present disclosure may be combined with one or more embodiments described above.

As shown in FIG. 4, the cargo container butting method according to an embodiment of the present disclosure may include step 401.

In step 401, when traveling to the butting region of the target cargo container, a position of a first-type target marker and a position of the second-type target marker on the target cargo container are identified.

The first-type target marker is a target marker on a side of the target cargo container close to the robot; and the second-type target marker is a target marker on a side of the target cargo container far away from the robot, or a target marker which is disposed on the bottom of the target cargo container and used for guiding the robot to butt the target cargo container.

In an embodiment of the present disclosure, multiple target markers may be disposed on different positions on the target cargo container, and the multiple target markers may be structural features provided by the target cargo container or also may be identifiable markers added to the target cargo container. When the robot receives a butting instruction for butting the target cargo container and travels to the target cargo container, among the multiple target markers on the target cargo container, a part of the target markers is close to the robot, and remaining part of the target markers is far away from the robot or is disposed on the bottom of the target cargo container. An direction indicated between the two parts of target markers may represents the practical placing position and/or placing angle of the target cargo container at the predetermined position to a certain extent. Of course, in order to distinguish the two types of target markers in the above target markers, the first-type target marker and the second-type target marker may be used for distinguishing. By identifying the positions of the first-type target marker and the second-type target marker on the target cargo container, the practical placing position and/or the practical placing angle of the target cargo container at the predetermined position may be estimated, so that the travel direction of the robot is adjusted according to the practical placing position and/or the practical placing angle of the target cargo container at the predetermined position.

In an embodiment of the present disclosure, the first-type target marker may be multiple target markers which are disposed at positions of different feet on the bottom of the target cargo container and on a side close to the robot. The target marker may be an identifiable container mark or an identifiable tag of the target cargo container. For example, the identifiable container mark may be a specific structural feature or the like on the target cargo container, and the identifiable tag may be a specific mark on the target cargo container, such as a two-dimensional code tag. In an embodiment, the first-type target marker may include a first target marker and a second target marker which are disposed at the positions of different feet on the bottom of the target cargo container and on the side close to the robot. In one example, the first target marker and the second target marker may each be two container legs disposed at positions of different feet on a side of the bottom of the target cargo container close to the robot; or, in another example, the first target marker and second target marker respectively may be identifiable tags or identifiable container leg features on two container legs disposed at different foot positions on a side of the bottom of the target cargo container close to the robot.

It should be understood that according to the position of the first target marker and the position of the second target marker, a central point of the two positions may be calculated. The central point may be used as a reference point for the robot to travel, and when traveling to the target cargo container, the robot may pass between the container legs at positions of two feet of the target cargo container and travel into the bottom of the target cargo container.

In an embodiment of the present disclosure, the first-type target marker may be at least one target marker (such as, 321 and 322 shown in FIG. 3B or 316a and 316b shown in FIG. 3D) which is disposed at a predetermined position on a side surface of the target cargo container and on the side close to the robot. The target marker may be an identifiable container mark or an identifiable tag of the target cargo container.

In another embodiment, the first-type target marker may also include a fifth target marker which is disposed at a predetermined position on a side surface of the target cargo container and on the side close to the robot. In one example, the fifth target marker may also be disposed on the side of the target cargo container close to the robot, and the fifth target marker may be disposed at the predetermined position on the side surface corresponding to the side of the target cargo container. The target marker may be an identifiable container mark or an identifiable tag of the target cargo container. For example, the identifiable container mark may be a specific structural feature on the target cargo container, and the identifiable tag may be a specific mark on the target cargo container, such as a two-dimensional code tag.

It should be understood that the position of the fifth target marker on the side surface of the target cargo container cannot be deviated too much. If it is deviated too much, the robot cannot travel from the position of the fifth target marker to the bottom of the target cargo container. To ensure that the fifth target marker is disposed at an appropriate position on the side surface of the target cargo container, in another example, the fifth target marker may be disposed at a central position (324 shown in FIG. 3B) on the side surface of the target cargo container and on the side close to the robot, or disposed on a central line (323 shown in FIG. 3B) connecting positions of the two feet of the bottom of the cargo container and on the side close to the robot, and the central line is on the side surface of the cargo container.

The robot may also use the position of the fifth target marker as a reference point, and the robot may also pass between the two feet of the target cargo container according to the reference point and travel into the bottom of the target cargo container.

In an embodiment of the present disclosure, the first-type target marker may be multiple target markers which are disposed at different foot positions on the bottom of the target cargo container and on a side far away from the robot. The target marker may be an identifiable container mark or an identifiable tag of the target cargo container. The second-type target marker may include a third target marker and a fourth target marker (such as 316c and 316d shown in FIG. 3D) disposed at positions of different feet on the bottom of the target cargo container and on the side away from the robot. In one example, the third target marker and the fourth target marker may be two container legs, respectively, at positions of different feet on a side of the bottom of the target cargo container far away from the robot, or may be identifiable tags or identifiable container leg structural features, on two container legs, respectively, at positions of different feet on the side of the bottom of the target cargo container far away from the robot.

It should be understood that according to the position of the third target marker and the position of the fourth target marker, a central point of the two positions may be calculated, and the central point may be used as another reference point for the robot to travel. After traveling into the bottom of the target cargo container, the robot may travel to a butting position on the bottom of the target cargo container successfully according to guidance of the two reference points, stop at the butting position, and butts the target cargo container through a lifting mechanism.

In another embodiment of the present disclosure, the second-type target marker may also be a target marker disposed on the bottom of the target cargo container and used for guiding the robot to travel. In an embodiment, the second-type target marker may also be a sixth target marker disposed on the bottom of the target cargo container and used for guiding the robot to travel (guiding the robot to travel to the butting position with the target cargo container), the sixth target marker may include multiple discrete markers or may be a continuous guiding belt, and a position of one end of the sixth target marker close to the robot corresponds to a position of the first-type target marker (that is a position of a reference point determined by the first-type target marker), so as to ensure that the robot directly reaches the position of the sixth target marker after passing through the position of the first-type target marker. In one example, the sixth target marker may be a specific structural feature on the target cargo container, multiple specific identifiable tags, or a specific guiding belt for the robot to move. Similarly, after traveling into the bottom of the target cargo container, the robot may further successfully travel to the butting position guided by the sixth target marker disposed on the bottom of the target cargo container.

In one implementation of an embodiment of the present disclosure, the step of identifying the position of the first-type target marker and the position of the second-type target marker on the target cargo container may include steps describe below.

In step 401a, at least one target marker identification module disposed on the robot is started.

In step 401b, the position of the first-type target marker and the position of the second-type target marker on the target cargo container are identified through the at least one target marker identification module.

In this implementation, at least one target marker identification module is disposed on the robot, and the position of the first-type target marker and the position of the second-type target marker on the target cargo container may be identified by the at least one target marker identification module disposed on the robot. The target marker identification module may refer to a target marker identification module including a laser radar or a camera, and the target marker identification module may include multiple laser radars or multiple cameras. The target marker identification module may be disposed at an appropriate position on the robot, and a practical disposed position may be determined according to a practical situation. Exemplarily, referring to FIG. 3A, one or more target marker identification modules 3102 may be disposed at a front position of the robot 310, and the one or more target marker identification modules 3102 may include multiple laser radars or cameras. In addition, in order to avoid that positions of the one or more target marker identification modules are too high to identify the target marker, the one or more target marker identification modules may be disposed at a position below the front end of the robot when the target marker is a specific identifiable tag disposed at positions of four container feet of the target cargo container or the target marker is the four container feet of the target cargo container. In an embodiment, the height of the one or more target marker identification modules coincides with the height of the target marker of the target cargo container.

In this implementation, when traveling to a butting region of the target cargo container, the robot may start the at least one target marker identification module disposed on the robot, and scan and identify multiple target markers on the target cargo container in the butting region through the at least one target marker identification module. The one or more target markers on the target cargo container and position information of the one or more target markers may be identified by the one or more target marker identification modules and it is determined which target markers are closer to the robot (that is, target markers on a side of the target cargo container close to the robot) and which target markers are farther from the robot (that is, target markers on a side of the target cargo container far away from the robot), so as to identify the position of the first-type target marker and the position of the second-type target marker on the target cargo container.

Exemplarily, referring to FIG. 3A, taking that a cargo container 311b with deviation is taken as the target cargo container, and that target markers on the target cargo container are four container legs disposed at positions of four feet of the bottom of the target cargo container as an example, when the robot 310 travels to the butting region 313 where the target cargo container is located, the robot 310 may identify the position of the first-type target marker and the position of the second-type target marker on the target cargo container by using at least one target marker identification module 3102. When the robot 310 travels to the butting region 313 of the target cargo container, two container legs on a side of the target cargo container close to the robot 310 are respectively a first container leg 316a and a second container leg 316b, and in this case, the first container leg 316a and the second container leg 316b may be used as the first-type target marker; when the robot 310 travels to the butting region 313 of the target cargo container, two container legs on the side of the target cargo container far away from the robot 310 are the third container leg 316c and the fourth container leg 316d, and the third container leg 316c and the fourth container leg 316d may be used as the second-type target marker.

In this implementation, since predetermined positions of one or more cargo containers are close to each other, when a cargo container at another predetermined position deviates, a part of a cargo container at the another predetermined position may deviate to the predetermined position of the target cargo container, thereby causing a case where not only the target cargo container but also the part of the cargo containers at the another predetermined position exist in the butting region. Therefore, when traveling to the butting region of the target cargo container, the robot may start the at least one target marker identification module disposed on the robot, identify and determine the target cargo container firstly, and then identify the multiple target markers on the target cargo container within the butting region.

In an embodiment, determination of the first-type target marker and the second-type target marker is not fixed, and the determination of the first-type target marker and the second-type target marker may be determined according to a distance between the target marker on the target cargo container and the robot when the robot travels to the butting region of the target cargo container. For example, when the robot is on another side of the target cargo container, a target marker disposed on the another side of the target cargo container may be the first-type target marker. The following is an exemplary explanation through an embodiment, referring to FIG. 3A, still taking that the cargo container 311b with deviation is taken as the target cargo container, and the target markers on the target cargo container are the four container legs disposed at the positions of four feet of the bottom of the target cargo container respectively as an example, when the robot 310 travels to an upper right position of the butting region 313, the first container leg 316a and the second container leg 316b on the target cargo container are determined as the first-type target marker because the first container leg 316a and the second container leg 316b are closer to the robot 310, and the third container leg 316c and the fourth container leg 316d on the target cargo container are determined as the second-type target marker because the third container leg 316c and the fourth container leg 316d are farther from the robot 310. However, when the robot 310 travels to an upper left position of the butting region 313, the second container leg 316b and fourth container leg 316d on the target cargo container are determined as the first-type target marker since the second container leg 316b and fourth container leg 316d are closer to the robot 310, and the first container leg 316a and the third container leg 316c on the target cargo container are determined as the second-type target marker since the first container leg 316a and the third container leg 316c are farther from the robot 310.

It can be seen that the determination of the first-type target marker and the second-type target marker is related to a distance from the target marker on the target cargo container to the robot when the robot travels to the butting region of the target cargo container.

In step 402, a first reference position is determined according to the position of the first-type target marker and a second reference position is determined according to the position of the second-type target marker.

In the embodiment of the present disclosure, a direction indicated between the first-type target marker and the second-type target marker may be understood as a practical placing angle of the target cargo container. After the practical placing angle of the target cargo container is determined, the robot may travel to the bottom of the target cargo container along the practical placing angle of the target cargo container. In order to better determine the practical placing angle of the target cargo container by using the first-type target marker and the second-type target marker, the first reference position may be determined according to the position of the first-type target marker, and the second reference position may be determined according to the position of the second-type target marker, the practical placing angle of the target cargo container may be estimated based on the first reference position and the second reference position, so that a travel path of the robot from a current position of the robot to the bottom of the target cargo container may be determined according to the practical placing angle of the target cargo container, and a travel direction of the robot is adjusted according to the determined travel path.

In one implementation of the embodiment of the present disclosure, the step of determining the first reference position according to the position of the first-type target marker may include steps described below.

A central position between the first target marker and the second target marker is calculated according to a position of the first target marker and a position of the second target marker, and the central position is taken as the first reference position. The first target marker and the second target marker are disposed on two different legs of the bottom of the target cargo container, respectively.

In this implementation, referring to FIG. 3A, taking that the first target marker and the second target marker in the first-type target marker are container legs disposed at positions of different feet on the bottom of the target cargo container, when the robot 310 travels to the upper right of the butting region 311 of the target cargo container, the first target marker is the first container leg 316a, and the second target marker is the second container leg 316b. The robot 310 may identify positions of the first container leg 316a and the second container leg 316b which are close to the side of the robot 310 of the first-type target marker. Position of a central point between the first container leg 316a and the second container leg 316b may be calculated according to the position of the first container leg 316a and the position of the second container leg 316b, and the position of the central point between the first container leg 316a and the second container leg 316b may be taken as the first reference position.

It should be understood that the first target marker and the second target marker of the first-type target marker include, but are not limited to, the container leg on the target cargo container as described above, and that the container leg on the target cargo container is taken as the target marker is only an explanation example in this implementation. In an embodiment, the first target marker and the second target marker may be target markers disposed on a side of the target cargo container close to the robot and at two different bottom feet of the target cargo container, respectively. The target marker may be an identifiable container mark or an identifiable tag of the target cargo container. For example, the identifiable container mark may be a specific structural feature on the target cargo container, and the identifiable tag may be a specific two-dimensional code tag on the target cargo container.

In another implementation of the embodiment of the present disclosure, the step of determining the first reference position according to the position of the first-type target marker may include steps described below.

A position of a fifth target marker of the first-type target marker is determined and taken as the first reference position. The fifth target marker is disposed on a predetermined position on a side of the target cargo container close to the robot.

In this implementation, referring to FIG. 3B, the fifth target marker may be disposed on a side surface of the target cargo container 311 on the side close to the robot, and the fifth target marker is disposed on a central line 323 connecting positions of a first bottom foot 321 and a second bottom foot 322 of the target cargo container 311. In an embodiment, the fifth target marker may slightly deviate from the central line 323, and is not necessarily disposed exactly on the central line 323, as long as it is located at a position within an allowable range from the central line 323. After determining a position of the fifth target marker of the first-type target marker, the position of the fifth target marker of the first-type target marker may be directly used as the first reference position. The fifth target marker may be an identifiable container mark or an identifiable tag of the target cargo container. For example, the identifiable container mark may be a specific structural feature on the target cargo container, and the identifiable tag may be a specific two-dimensional code tag on the target cargo container. It should be understood that a specific description of the fifth target marker may be referred to related explanations in the present embodiment.

In one implementation of the embodiment of the present disclosure, the step of determining the second reference position according to the position of the second-type target marker may include steps described below.

A central position between the third target marker and the fourth target marker is calculated according to positions of the third target marker and the fourth target marker of the second-type target marker, and the central position is taken as the second reference position. The third target marker and the fourth target marker are disposed on another two different legs of the bottom of the target cargo container, respectively.

In this implementation, referring to FIG. 3A, taking that the third target marker and the fourth target marker in the second-type target marker are respectively identifiable tags on container legs disposed at positions of different feet on the bottom of the target cargo container 311b as an example, when the robot 310 travels to the upper right of the butting region 311 of the target cargo container, the third target marker is an identifiable tag on a third container leg 316c, and the fourth target marker is an identifiable tag on a fourth container leg 316d. The robot 310 may identify positions of identifiable tags on the third container leg 316c and the fourth container leg 316d on a side of the second-type target marker far away from the robot 310. A position of a central point between the identifiable tag on the third container leg 316c and the identifiable tag on the fourth container leg 316d may be calculated according to the position of the identifiable tag on the third container leg 316c and the position of the identifiable tag on the fourth container leg 316d, and the central point between the identifiable tag on the third container leg 316c and the identifiable tag on the fourth container leg 316d may be used as the second reference position.

The third target marker and the fourth target marker in the second-type target marker include, but are not limited to, the identifiable tag of the container leg on the target cargo container as described above, and that the identifiable tag of the container leg on the target cargo container is taken as the target marker is only an explanation example in this implementation. In an embodiment, the third target marker and the fourth target marker may be respectively target markers disposed on a side of the target cargo container far away from the robot and on two different feet on the bottom of the target cargo container. The target marker may be an identifiable container mark or an identifiable tag of the target cargo container. For example, the identifiable container mark may be a specific structural feature on the target cargo container, and the identifiable tag may be a specific two-dimensional code tag on the target cargo container.

In one implementation of the embodiment of the present disclosure, the step of determining the second reference position according to the position of the second-type target marker may include steps described below.

A position of a sixth target marker of the second-type target marker is determined as the second reference position; and the sixth target marker is disposed on the bottom of the target cargo container, and a position of one end of the sixth target marker close to the robot corresponds to a position of the first-type target marker.

In this embodiment, the sixth target marker may be an identifiable container mark or an identifiable tag disposed on the bottom of the target cargo container, and a position of one end of the identifiable container mark or the identifiable tag close to the robot corresponds to the position of the first-type target marker, so as to ensure that the robot directly transits from the position of the first-type target marker to the position of the sixth target marker and travels to the butting position. For example, the identifiable container mark may be a specific structural feature on the target cargo container, and the identifiable tag may be a specific two-dimensional code tag on the target cargo container. In an embodiment, the sixth target marker may be a guiding belt for the robot to move disposed on the bottom of the target cargo container, and a position of one end of the guiding belt for the robot to move close to the robot corresponds to the position of the first-type target marker. The guiding belt for the robot to move passes through a target position on the bottom of the target cargo container and the position of the first-type target marker. A form of a path indicated by the guiding belt for the robot to move is not limited to a straight line, and the determined travel path may be a broken line travel path or an arc travel path.

In step 403, a travel direction of the robot is adjust according to the first reference position and the second reference position.

In the embodiment of the present disclosure, referring to FIG. 3B and FIG. 3D, the robot 310 may use a connecting line between the current position of the robot 310, the first reference position, and the second reference position as a travel path for the robot 310 to travel into the bottom of the target cargo container. The robot 310 may adjust the travel direction of the robot 310 traveling into the bottom of the target cargo container according to a route direction indicated by the determined travel path for the robot to travel into the bottom of the target cargo container, and travel into the bottom of the target cargo container according to the adjusted travel direction. It should be understood that the current position of the robot 310, the first reference position and the second reference position may be used as a reference position for determining the travel path, and thus the form of the travel path determined according to the connecting line between the current position of the robot 310, the first reference position and the second reference position is not limited to a straight line, and the determined travel path may be a broken line travel path or an arc travel path.

In step 404, the robot travels into the bottom of the target cargo container according to the adjusted travel direction, and butts the target cargo container on the bottom of the target cargo container.

In the embodiment of the present disclosure, the target cargo container may be a shelf allowing for fixed placement, or may be a cage trolley with universal wheels or other wheels. Generally, container legs or universal wheels are disposed at positions of four bottom feet of the target cargo container, and if the robot does not travel according to the adjusted travel direction, the robot is easily blocked by the container legs or the universal wheels at the positions of the four bottom feet of the target cargo container, and thus cannot successfully travel into the bottom of the target cargo container. Therefore, when the robot travels into the bottom of the target cargo container according to the adjusted travel direction, the robot will not be blocked by the container legs or the universal wheels at the positions of the four bottom legs of the target cargo container, and can successfully enter the bottom of the target cargo container and butt the target cargo container on the bottom of the target cargo container.

In the embodiment of the present disclosure, when the robot transports the target cargo container, the robot first butts the target cargo container, and a position for the robot butting the target cargo container on the bottom of the target cargo container may be used as a target position. The target position may be determined according a practical structure of the target cargo container butted by the robot. For example, when the target cargo container has a uniform and symmetrical cuboid structure, a central position of the bottom of the target cargo container may be used as the target position; however, when the target cargo container does not have uniform and symmetrical distribution, the central position of the bottom of the target cargo container cannot be used as the target position, and once the central position is used as the target position, the target cargo container cannot keep balance on the robot after the robot butts the target cargo container at the target position. Therefore, the target position may be determined on the bottom of the target cargo container according to the practical structure of the target cargo container, and the robot travels into the bottom of the target cargo container according to the adjusted travel direction and butts the target cargo container at the predetermined target position of the bottom of the target cargo container.

In one implementation of the embodiment of the present disclosure, the step of traveling into the bottom of the target cargo container according to the adjusted travel direction, and butting the target cargo container on the bottom of the target cargo container includes steps described below.

In step 4041*a*, the robot travels into the bottom of a target cargo container according to the adjusted travel direction, and meanwhile starts a target mark identification module disposed on the robot.

In step 4041*b*, the robot continues to travel according to the adjusted travel direction on the bottom of the target cargo container and identifies a target mark disposed on the bottom of the target cargo container through the target mark identification module.

In step 4041*c*, if the target mark on the bottom of the target cargo container is identified, the robot travels to a target position corresponding to the target mark on the bottom of the target cargo container, and stops traveling after reaching the target position corresponding to the target mark.

In step 4041*d*, at the target position, the robot uses the target mark on the bottom of the target cargo container as an alignment point to butt the target cargo container.

In this implementation, referring to FIG. 3C and FIG. 3D, a target mark 317 may be disposed in advance at the target position on the bottom of the target cargo container. The robot 310 may travel into the bottom of the target cargo container according to the adjusted travel direction, and start the target mark identification module disposed on the robot while traveling into the bottom of the target cargo container. The robot 310 may identify the target mark 317 disposed on the bottom of the target cargo container in the travel direction through the target mark identification module. The target mark identification module 3101 may be disposed at a top concave position of the robot 310, and the target marker identification module 3101 may include one or more cameras. The target mark may be understood as a position mark for identifying a target position of the bottom of the target cargo container. The position mark may be a specific identifiable tag, such as a two-dimensional code tag, disposed at a target position on the bottom of the cargo container; or the position mark may be a container structural feature at a target position on the bottom of the cargo container, such as a "cross" structural feature disposed at the target position on the bottom of the cargo container.

In this implementation, referring to FIG. 3C and FIG. 3D, if the target mark disposed on the bottom of the target cargo container is identified, it is determined that the robot 310 has traveled to the target position on the bottom of the target cargo container, that is, a stop position of the robot 310 is the target position dispose on the bottom of the target cargo container, and at this time, the robot 310 stops traveling. After traveling to the target position on the bottom of the target cargo container, generally, the robot 310 may directly butt the cargo container at the stop position of the robot 310. However, considering that the stop position of the robot 310 may still have a slight deviation from the target position of the target cargo container, in order to improve precision of the robot 310 butting the target cargo container, the target marker disposed on the bottom of the target cargo container may be used as an alignment point to precisely butt the target cargo container. In other words, the robot 310 may perform butting guidance at the stop position using the target marker disposed on the bottom of the target cargo container as the alignment point, and a butting path of the robot 310 and the target cargo container is finely adjusted during the butting process, so as to precisely butt the target cargo container.

In another implementation of the embodiment of the present disclosure, before traveling into the bottom of the target cargo container according to the adjusted travel direction, a step described below may be included. Information of the target position on the bottom of the target cargo container is determined. Correspondingly, the step of traveling into the bottom of the target cargo container according to the adjusted travel direction, and butting the target cargo container on the bottom of the target cargo container, may include steps described below.

In step 4042*a*, the robot travels into the bottom of a target cargo container according to the adjusted travel direction, and meanwhile starts a target mark identification module disposed on the robot.

In step 4042*b*, when it is detected that the robot has traveled into the bottom of the target cargo container according to the adjusted travel direction, the robot directly travels to a position indicated by target position information according to the determined target position information of the bottom of the target cargo container.

In step 4042*c*, at the position indicated by the target position information, a target mark on the bottom of the target cargo container is identified through the target mark identification module, and the target marker is used as the alignment point to butt the target cargo container.

In this implementation, a difference between this implementation and the implementation in step 4041*a* to step 4041*c* is that, after traveling into the bottom of the target cargo container, the robot 310 in this implementation does not identify the target mark dispose on the bottom of the target cargo container in the travel direction by the target mark identification module *a*, but directly travels to the position indicated by the target position information according to the determined target position information on the bottom of the target cargo container. Then, at the position indicated by the target position information, a target mark on the bottom of the target cargo container is identified through the target mark identification module, and the target mark is used as the alignment point to butt the target cargo container. It should be understood that, the explanation of the related technical features in this implementation may be referred to the explanations in step 4041*a* to step 4041*c*, and details are not repeated here.

In another implementation of the embodiment of the present disclosure, the step of traveling into the bottom of the target cargo container according to the adjusted travel direction, and butting the target cargo container on the bottom of the target cargo container includes steps described below.

In step 4043*a*, a stop position for butting the target cargo container is calculated according to the first reference position and the second reference position.

In step 4043*a*, the robot travels in the adjusted travel direction to the stop position for butting the target cargo container on the bottom of the target cargo container, and butts the target cargo container at the stop position.

The cargo container butting method provided in the embodiment of the present disclosure includes steps described below. When the robot travels to a butting region of the target cargo container, a target marker on a side of the target cargo container close to the robot is identified and a target marker on a side of the target cargo container far away from the robot is identified, and a travel path for the robot traveling into the bottom of the target cargo container is determined according to a position of the target marker on a side of the target cargo container close to the robot and a position of the target marker on a side of the target cargo container far away from the robot acquired through identification. The travel direction of the robot is adjusted according to the travel path of the robot traveling into the bottom of the target cargo container. The robot travels into the bottom of the target cargo container according to the adjusted travel direction, and butts the target cargo container on the bottom of the target cargo container. The present disclosure ensures that in a case where the target cargo container is placed to be deviated from a predetermined position, the robot can still find the target cargo container in a travel process and adjust the travel direction and determine the stop position in time. Therefore, the robot can precisely butt the target cargo container on the bottom of the target cargo container, and the efficiency of the robot butting the target cargo container is enhanced, thereby reducing time for the robot to move the cargo container, and accelerating cargo moving. Meanwhile the dependence of the robot on fixed ground marker is reduced.

Figure 5:
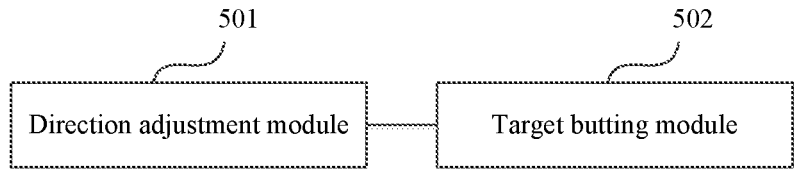
FIG. 5 is a structural schematic diagram of a cargo container butting apparatus according to an embodiment of the present disclosure.

FIG. 5 is a structural schematic diagram of a cargo container butting apparatus according to an embodiment of the present disclosure. The embodiment of the present disclosure may be applied to a case that the robot transport one or more cargo containers in a warehouse or near a production line, the apparatus may be implemented in a software and/or hardware manner, the apparatus may be integrated in any robot with a network communication function, and the robot may be a self-driven robot.

As shown in FIG. 5, the cargo container butting apparatus in the embodiment of the present disclosure may include a direction adjustment module 501 and a target butting module 502.

The direction adjustment module 501 is configured to: in a case where the robot travels to a butting region of the target cargo container, adjust a travel direction of the robot according to a position of a target marker on the target cargo container.

The target butting module 502 is configured to travel into the bottom of the target cargo container according to the adjusted travel direction and butt the target cargo container on the bottom of the target cargo container.

In an implementation of the embodiment of the present disclosure, the direction adjustment module 501 may include a marker identification unit, a reference position determination unit and a travel direction adjustment unit.

The marker identification unit is configured to identify a position of a first-type target marker and a position of a second-type target marker on the target cargo container. The first type of target marker is a target marker on a side of the target cargo container close to the robot; and the second-type target marker is a target marker on a side of the target cargo container far away from the robot, or a target marker disposed on the bottom of the target cargo container and used for guiding the robot to travel.

The reference position determination unit is configured to determine a first reference position according to a position of the first-type target marker and a second reference position according to a position of the second-type target marker.

The travel direction adjustment unit in configured to adjust the travel direction of the robot according to the first reference position and the second reference position.

In an implementation of the embodiment of the present disclosure, the marker identification unit may include a first starting sub-unit, and a first identification sub-unit.

The first starting sub-unit is configured to start at least one target marker identification module disposed on the robot.

The first identification sub-unit is configured to identify the position of the first-type target marker and the position of the second-type target marker on the target cargo container through the at least one target marker identification module.

In an implementation of the embodiment of the present disclosure, the reference position determination unit may include one of the follow units.

A first reference position determination sub-unit is configured to calculate a central position between a first target marker and a second target marker of the first-type target marker according to a position of the first target marker and a position of the second target marker, and take the central position as the first reference position. The first target marker and the second target marker are disposed on two different feet on the bottom of the target cargo container, respectively.

A first reference position determination sub-unit is configured to determine a position of a fifth target marker of the first-type target marker and take the determined position as the first reference position. The fifth target marker is disposed on a side of the target cargo container close to the robot, and the fifth target marker is disposed at a predetermined position on a side surface of the target cargo container corresponding to the side.

In an implementation of the embodiment of the present disclosure, the reference position determination unit may include one of the follow units.

A second reference position determination sub-unit is configured to calculate a central position between a third target marker and a fourth target marker of the second-type target marker according to a position of the third target marker and a position of the fourth target marker, and take the central position as the second reference position. The third target marker and the fourth target marker are disposed on the other two different feet of the bottom of the target cargo container, respectively.

A second reference position determination sub-unit is configured to determine a position of a sixth target marker of the first-type target marker and take the determined position as the second reference position. The sixth target marker is disposed on the bottom of the target cargo container, and a position of an end of the sixth target marker close to the robot corresponds to the position of the first-type target marker.

In an implementation of the embodiment of the present disclosure, the target butting module 502 may include a second starting unit, a second identification unit, a target searching unit and a target butting unit.

The second starting unit is configured to start a target marker identification module disposed on the robot.

The second identification unit is configured to travel on the bottom of the target cargo container according to the adjusted travel direction, identify a target mark disposed on the bottom of the target cargo container through the target mark identification module.

The target searching unit is configured to: if the target mark on the bottom of the target cargo container is identified, travel to a target position corresponding to the target mark, and stop traveling after reaching the target position corresponding to the target mark.

The target butting unit is configured to butt the target cargo container at the butting position with a target mark disposed on the bottom of the target cargo container as an alignment point.

In an implementation of the embodiment of the present disclosure, the target butting module 502 may include a stop position calculation unit and a target butting unit.

The stop position calculation unit is configured to calculate a stop position for butting the target cargo container according to the first reference position and the second reference position.

The target butting unit is configured to travel in the adjusted travel direction to the stop position for butting the target cargo container, and butts the target cargo container at the stop position.

The cargo container butting apparatus provided in the embodiment of the present disclosure may execute the cargo container butting method provided in any embodiment of the present disclosure and have corresponding functional modules and effects for executing the cargo container butting method.

Figure 6:
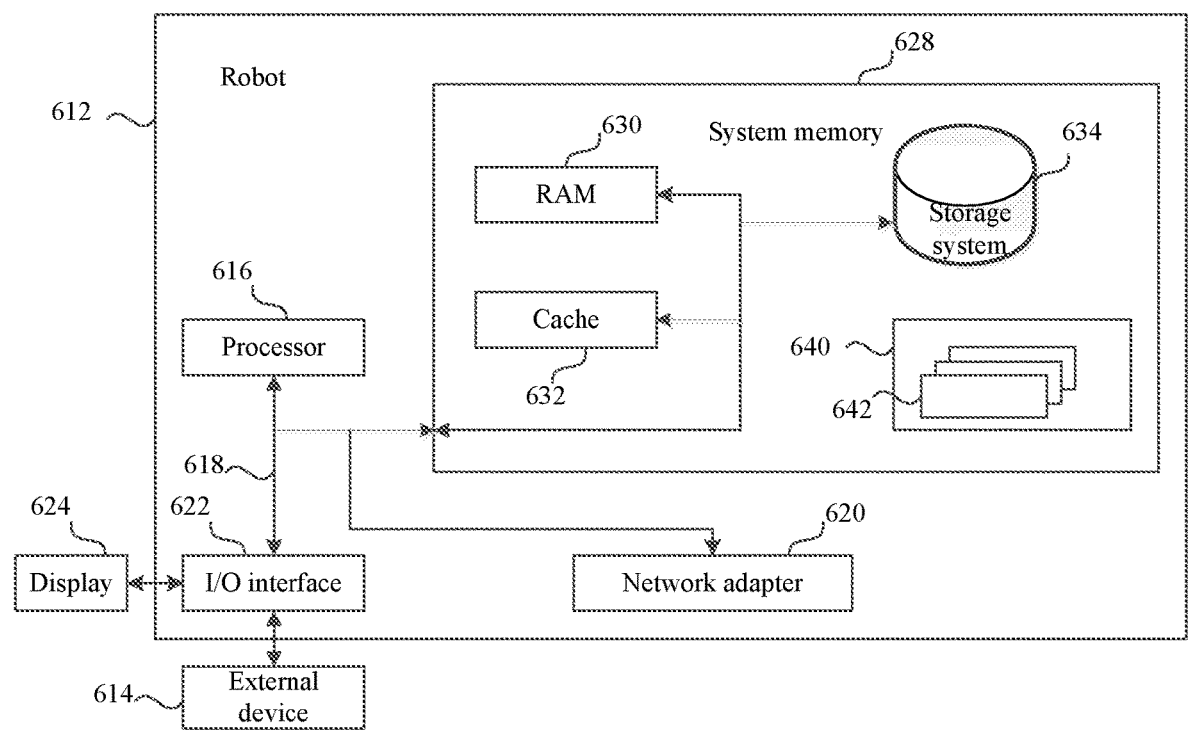
FIG. 6 is a structural diagram of a robot according to an embodiment of the present disclosure.

FIG. 6 is a structural diagram of a robot according to an embodiment of the present disclosure. FIG. 6 illustrates a block diagram of an exemplary robot 612 for the implementation of the present disclosure. The robot 612 shown in FIG. 6 is merely an example.

As shown in FIG. 6, the robot 612 is in a form of a general purpose computing device. Components of the robot 612 may include, but are not limited to: one or more processors 616, a system memory 628, and a bus 618 connecting different system components (including the system memory 628 and the processors 616).

The bus 618 represents one or more types among several types of bus structure, including a memory bus or a memory controller, a peripheral bus, a graphics acceleration port, a processor, or a local area bus using any of a variety of bus structures. For example, the architectures include, but are not limited to, an Industry Standard Architecture (ISA) bus, a Micro Channel Architecture (MAC) bus, an enhanced ISA bus, a Video Electronics Standards Association (VESA) local bus, and a Peripheral Component Interconnect (PCI) bus.

The robot 612 includes a variety of computer system readable media. The media may be any available media capable of being accessed by the robot 612, including volatile and nonvolatile, removable and non-removable media.

The system memory 628 may include computer system readable media in the form of volatile memory, such as a Random Access Memory (RAM) 630 and/or a cache memory 632. The robot 612 may include other removable/non-removable, volatile/nonvolatile computer system storage media. By way of example only, the storage system 634 may be configured to read from and write to non-removable, nonvolatile magnetic media (not shown in FIG. 6 and commonly referred to as a "hard disc drive"). Although not shown in FIG. 6, a magnetic disc drive for reading from and writing to a removable, nonvolatile magnetic disc (such as a "floppy disc") and an disc drive for reading from or writing to a removable, nonvolatile optical disc (such as, a Compact Disc Read-Only Memory (CD-ROM), or a Digital Video Disc Read-Only Memory (DVD-ROM), or other optical media) may be provided. In these cases, each drive may be connected to the bus 618 by at least one data media interface. The memory 628 may include at least one program product having a set (e.g., at least one) of program modules that are configured to perform the functions of at least one embodiment of the present disclosure.

A program/utility 640 having a set (at least one) of program modules 642 may be stored, for example, in the memory 628. Such program module 642 includes, but is not limited to, an operating system, one or more application programs, other program modules, and program data and each of the example or some combination of the example may include an implementation of a networking environment. The program module 642 generally performs the functions and/or the methods of the embodiments described in the present disclosure.

The robot 612 may also communicate with one or more external devices 614 (such as a keyboard, a pointing device, a display 624), one or more devices that enable a user to interact with the robot 612, and/or any devices (such as, a network card, a modem) that enable the robot 612 to communicate with one or more other computing devices. Such communication may be through an Input/Output (I/O) interface 622. Furthermore, the robot 612 may communicate with one or more networks (e.g., a Local Area Network (LAN), a Wide Area Network (WAN), and/or a public network such as the Internet) via a network adapter 620. As shown, the network adapter 620 communicates the other modules of the robot 612 via the bus 618. It should be understood that although not shown in FIG. 6, other hardware and/or software modules may be used in conjunction with the robot 612 and the modules include but are not limited to: microcode, a device drive, a redundant processing unit, a Redundant Arrays of Independent Drives (RAID) system, a tape drive, a data backup storage system, and the like.

The processor 616, by executing programs stored in the system memory 628, performs one or more functional applications and data processing, such as implementing a cargo container butting method provided in the present disclosure, and the method includes steps described below.

In a case of travelling to a butting region of the target cargo container, a travel direction of the robot is adjusted according to a position of a target marker on the target cargo container.

A robot travels into the bottom of the target cargo container according to the adjusted travel direction, and butts the target cargo container on the bottom of the target cargo container.

The present disclosure further provides a computer-readable storage medium for storing a computer program. When executed by a processor, the computer-readable storage medium implements the cargo container butting method provided in the present disclosure and the method includes steps described below.

In a case of travelling to a butting region of the target cargo container, a travel direction of the robot is adjusted according to a position of a target marker on the target cargo container.

A robot travels into the bottom of the target cargo container according to the adjusted travel direction, and butts the target cargo container on the bottom of the target cargo container.

The computer storage medium in the present disclosure may use any combination of one or more computer-readable media. The computer-readable medium may be a computer-readable signal medium or a computer readable storage medium. The computer-readable storage medium may be, for example, but not limited to, an electronic, magnetic, optical, electromagnetic, infrared, or semiconductor system, apparatus, or means, or any combination of the foregoing. The computer-readable storage medium includes (a non-exhaustive list): an electrical connection having one or more wires, a portable computer disc, a hard disk, a RAM, a Read-Only Memory (ROM), an Erasable Programmable Read-Only Memory (EPROM), or a flash Memory, an optical fiber, a CD-ROM, an optical storage means, a magnetic storage means, or any suitable combination of the foregoing. In the present disclosure, the computer readable storage medium may be any tangible medium that can contain, or store a program. The program may be use by an instruction execution system, apparatus, or means or used in combination therewith.

The computer-readable signal medium may include a propagated data signal in baseband or as part of a carrier wave and carry computer-readable program code. The propagated data signal may use a variety of forms, which include, but are not limited to, an electro-magnetic signal, an optical signal, or any suitable combination thereof. The computer-readable signal medium also may be any computer readable medium that is not a computer readable storage medium and that can send, propagate, or transmit a program for use by an instruction execution system, apparatus, or means or used in combination therewith.

Program code contained on the computer-readable medium may be transmitted using any appropriate medium, including but not limited to wireless, wire line, optical fiber cable, Radio Frequency (RF), etc., or any suitable combination of the foregoing.

Computer program code for performing the operations of the present disclosure may be written in one or more programming languages, or in a combination thereof. The programming languages include an object oriented programming language such as Java, Smalltalk, C++, and also conventional procedural programming language, such as the "C" programming language or a similar programming language. The program code can be executed entirely on a user's computer, partly on the user's computer, as an independent software package, partly on the user's computer and partly on a remote computer, or entirely on a remote computer or server. In a case of the remote computer, the remote computer can be connected to the user's computer through any type of network, including a LAN or a WAN, or it can be connected to an external computer (such as using an Internet service provider to connect over the Internet).

What is claimed is:

1. A cargo container butting method, performed by a robot, comprising:

entering to a butting region of a target cargo container, determining a reference position according to a position of a target marker on the target cargo container and adjusting a travel direction of the robot according to the reference position; and traveling to a bottom of the target cargo container according to the adjusted travel direction, traveling to a butting position of the target cargo container, and butting the target cargo container at the butting position of the bottom of the target cargo container, wherein the butting region of the target cargo container is determined to be entered by detecting that a distance between the robot and a marker of the target cargo container is smaller than a second preset distance;

wherein determining the reference position according to the position of the target marker on the target cargo container and adjusting the travel direction of the robot according to the reference position comprises:

identifying a position of a first-type target marker and a position of a second-type target marker on the target cargo container;

determining a first reference position according to the position of the first-type target marker comprising determining a position of a fifth target marker of the first-type target marker and taking the position as the first reference position, wherein the fifth target marker is disposed at a predetermined position on a side of the target cargo container close to the robot; and determining a second reference position according to the position of the second-type target marker, wherein the first reference position is configured to guide the robot to pass through a middle point between two feet of the target cargo container and travel into the bottom of the target cargo container, and the second reference position is configured to guide the robot to travel to the butting position of the target cargo container under the bottom of the target cargo container; and adjusting the travel direction of the robot according to the first reference position and the second reference position.

2. The method of claim 1, wherein identifying the position of the first-type target marker and the position of the second-type target marker on the target cargo container comprises:

starting at least one target marker identification module disposed on the robot; and identifying the position of the first-type target marker and the position of the second-type target marker on the target cargo container through the at least one target marker identification module.

3. The method of claim 1, wherein determining the first reference position according to the position of the first-type target marker comprises:

calculating a central position between a first target marker and a second target marker of the first-type target marker according to a position of the first target marker and a position of the second target marker, and taking the central position as the first reference position, wherein the first target marker and the second target marker are disposed on two different feet of the bottom of the target cargo container, respectively.

4. The method of claim 1, wherein determining the second reference position according to the position of the second-type target marker comprises one of:

calculating a central position between a third target marker and a fourth target marker of the second-type target marker according to a position of the third target marker and a position of the fourth target marker, and taking the central position as the second reference position, wherein the third target marker and the fourth target marker are disposed on another two different feet of the bottom of the target cargo container, respectively; or determining a position of a sixth target marker of the second-type target markers and taking the position as the second reference position, wherein the sixth target marker is disposed on the bottom of the target cargo container.

5. The method of claim 1, further comprising:

starting a target mark identification module disposed on the robot;

continuing traveling according to the adjusted travel direction, identifying a target mark disposed on the bottom of the target cargo container through the target mark identification module; and in response to an identification result of the target mark disposed on the bottom of the target cargo container, traveling to a target position corresponding to the target mark, and stopping traveling after reaching the target position corresponding to the target mark, wherein the target position is the butting position of the target cargo container.

6. The method of claim 1, wherein a non-transitory, computer-readable storage medium stores a computer program which, when executed by a processor, implements the method of claim 1.

7. The method of claim 1, wherein when butting the target cargo container a hook mechanism is used.

8. A robot, comprising:

a marker identification module and a tag identification module;

at least one processor; and a storage apparatus, configured to store at least one program, wherein when executed by the at least one processor, the program causes the at least one processor to:

entering to a butting region of a target cargo container, determine a reference position according to a position of a target marker on the target cargo container and adjust a travel direction of the robot according to the reference position; and travel to a bottom of the target cargo container according to the adjusted travel direction, travel to a butting position of the target cargo container, and butt the target cargo container at the butting position of the bottom of the target cargo container, wherein the butting region of the target cargo container is determined to be entered by detecting that a distance between the robot and a marker of the target cargo container is smaller than a second preset distance;

wherein the program causes the at least one processor to determine the reference position according to the position of the target marker on the target cargo container and adjust the travel direction of the robot according to the reference position in the following manners:

identify a position of a first-type target marker and a position of a second-type target marker on the target cargo container;

determine a first reference position according to the position of the first-type target marker comprising determining a position of a fifth target marker of the first-type target marker and taking the position as the first reference position, wherein the fifth tar et marker is disposed at a predetermined position on a side of the target cargo container close to the robot; and determine a second reference position according to the position of the second-type target marker, wherein the first reference position is configured to guide the robot to pass through a middle point between two feet of the target cargo container and travel into the bottom of the target cargo container, and the second reference position is configured to guide the robot to travel to the butting position of the target cargo container under the bottom of the target cargo container; and adjust the travel direction of the robot according to the first reference position and the second reference position.

9. The robot of claim 8, wherein the program to identify the position of the first-type target marker and the position of the second-type target marker on the target cargo container causes the at least one processor to:

start at least one target marker identification module disposed on the robot; and identify the position of the first-type target marker and the position of the second-type target marker on the target cargo container through the at least one target marker identification module.

10. The robot of claim 8, wherein the program to determine the first reference position according to the position of the first-type target marker causes the at least one processor:

calculate a central position between a first target marker and a second target marker of the first-type target marker according to a position of the first target marker and a position of the second target marker, and take the central position as the first reference position, wherein the first target marker and the second target marker are disposed on two different feet of the bottom of the target cargo container, respectively.

11. The robot of claim 8, wherein the program to determine the second reference position according to the position of the second-type target marker causes the at least one processor to one of:
calculate a central position between a third target marker and a fourth target marker of the second-type target marker according to a position of the third target marker and a position of the fourth target marker, and take the central position as the second reference position, wherein the third target marker and the fourth target marker are disposed on another two different feet of the bottom of the target cargo container, respectively; or
determine a position of a sixth target marker of the second-type target markers and take the position as the second reference position, wherein the sixth target marker is disposed on the bottom of the target cargo container.

12. The robot of claim 8, wherein the program further causes the at least one processor to:
start a target mark identification module disposed on the robot;
continuing traveling according to the adjusted travel direction, identify a target mark disposed on the bottom of the target cargo container through the target mark identification module; and
in response to an identification result of the target mark disposed on the bottom of the target cargo container, travel to a target position corresponding to the target mark, and stop traveling after reaching the target position corresponding to the target mark, wherein the target position is the butting position of the target cargo container.

13. The robot of claim of claim 8, further comprising a mechanism for hooking the target cargo container.

14. A robot, comprising:
a first sensor, a memory and a processor, wherein the processor is electrically connected to the first sensor and the memory respectively;
wherein the first sensor is configured to identify a container foot of a target cargo container in a case of entering a butting region of the target cargo container;
wherein the butting region of the target cargo container is determined to be entered by detecting that a distance between the robot and a marker of the target cargo container is smaller than a second preset distance;
wherein the memory stores a computer program, which when executed by the processor, causes the processor to:
calculate a position of the container foot of the target cargo container according to an identification result of the first sensor;
determine a butting route and a butting position of the robot and the target cargo container according to at least the position of the container foot of the target cargo container; and
control the robot to, according to the butting route, travel into the bottom of the target cargo container and travel to the butting position, wherein the robot butts the target cargo container at the butting position;
wherein the computer program causes the process to determine the butting route and the butting position of the robot and the target cargo container according to at least the position of the container foot of the target cargo container in following manners:
identify positions of two container feet on a first side of the target cargo container and positions of two container feet on a second side of the target cargo container;
determine a first reference position according to the positions of the two container feet on the first side of the target cargo container comprising determining a position of a fifth target marker of the first-type target marker and taking the position as the first reference position, wherein the fifth target marker is disposed at a predetermined position on a side of the tar et cargo container close to the robot; and
determine a second reference position according to the positions of the two container feet on the second side of the target cargo container,
wherein the first reference position is configured to guide the robot to pass through a middle point between two container feet of the target cargo container and travel into the bottom of the target cargo container, and the second reference position is configured to guide the robot to travel to the butting position of the target cargo container under the bottom of the target cargo container; and
adjust the travel direction of the robot according to the first reference position and the second reference position.

15. The robot of claim 14, further comprising: a second sensor, wherein the processor is electrically connected to the second sensor;
wherein the second sensor is configured to identify target marker on the bottom of the target cargo container after the robot travels to the bottom of the target cargo container; and
wherein the computer program, when executed by the processor, further causes the processor to determine the butting position of the target cargo container according to the position of the container foot of the target cargo container and the target mark on the bottom of the target cargo container.

16. The robot of claim 15, wherein the first sensor is configured to identify at least two container feet of the target cargo container.

17. The robot of claim 15, wherein at least one container foot of the target cargo container is provided with an identifiable container mark and an identifiable tag.

18. The robot of claim 14, wherein the first sensor is configured to identify at least two container feet of the target cargo container.

19. The robot of claim 18, wherein at least one container foot of the target cargo container is provided with an identifiable container mark and an identifiable tag.

20. The robot of claim 14, wherein at least one container foot of the target cargo container is provided with an identifiable container mark and an identifiable tag.

* * * * *